Nov. 17, 1936.  A. W. TONDREAU  2,061,178
MOTION PICTURE CAMERA
Original Filed June 17, 1932  3 Sheets-Sheet 1

INVENTOR:
ALBERT W. TONDREAU.
BY
ATTORNEY.

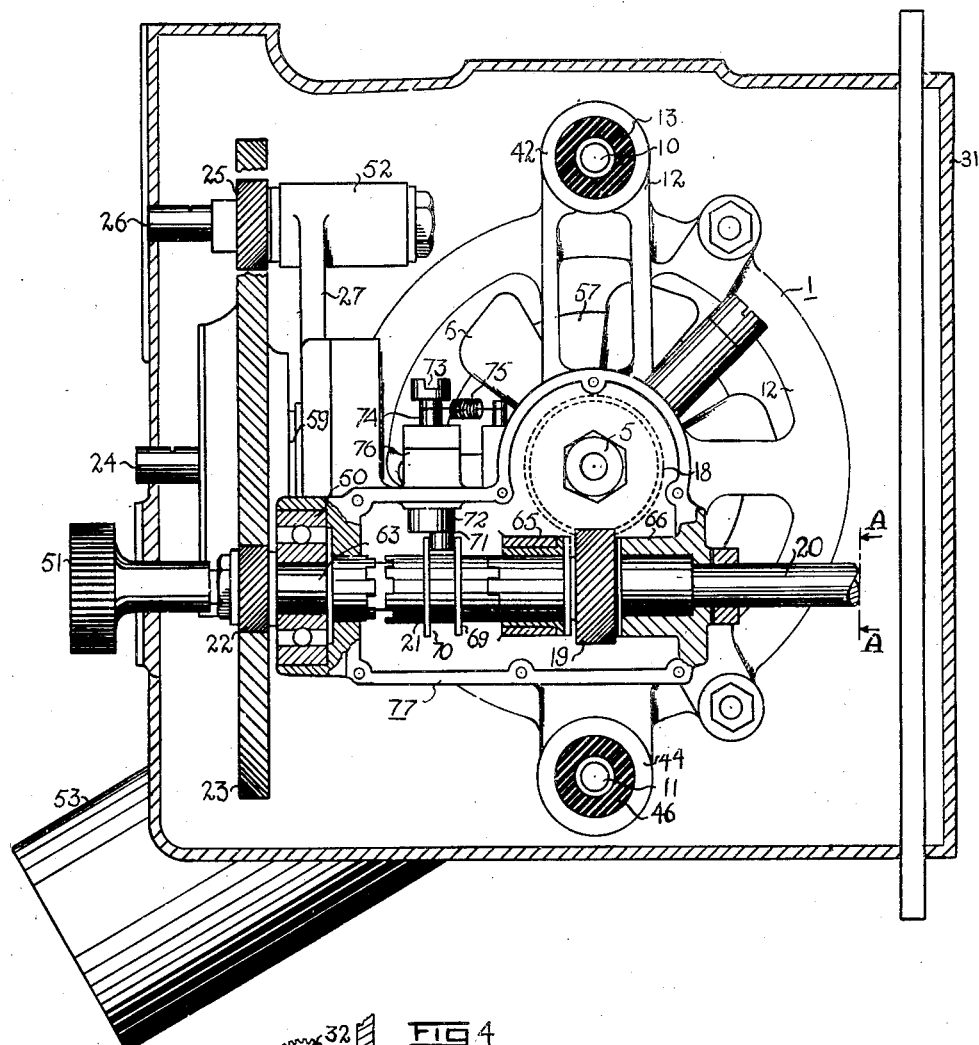

Patented Nov. 17, 1936

2,061,178

UNITED STATES PATENT OFFICE 2,061,178

MOTION PICTURE CAMERA

Albert W. Tondreau, Glendale, Calif., assignor to Warner Bros. Pictures, Inc., New York, N. Y., a corporation of Delaware Application June 17, 1932, Serial No. 617,757
Renewed April 18, 1936

18 Claims. (Cl. 88—17)

This invention relates to a motion picture camera and more particularly to a mounting arrangement for the motor therefor, thereby insuring the quiet operation thereof during the taking of sound motion pictures.

It has heretofore been the custom to attach the motor to the camera as a separate detachable unit with metallic connections, which are always noisy and cause vibration of the camera.

The whole of this assembly was enclosed in a clumsy soundproof casing called a "blimp". The blimp had to be practically air tight in order to be soundproof, and thereby prevent the camera noise from reaching the microphone. Due to the lack of proper ventilation in an arrangement of this sort, a camera therein could only be run for a short space of time and it then became necessary to open the device and allow the accumulated hot air and gases generated by the motor to escape. In some types of blimp, an explosion has taken place when an operator has not been sufficiently careful in limiting the length of time during which his camera operated therein.

These defects have been overcome by the present invention which provides a novel arrangement whereby the camera and motor is so silent in operation, that a blimp is not necessary, the camera motor being efficiently cooled so that shots of a great length may be taken if necessary.

The motor of this invention is also vibrationless in motion, as it is resiliently supported on the side of the camera. This feature is embodied in a compact form by providing at the side of the camera a detachable housing in which the motor is suspended so that the shaft thereof is parallel with the shutter shaft of the camera. A fan is provided which works in conjunction with a series of openings at the front and the back of the motor casing so that when the motor is running, cool air is drawn in from the front and after circulating round the motor, is exhausted at the rear. This not only insures a cool motor at all times but it also prevents sound waves set up by the motor from reaching the microphone which is usually located in front of the camera.

For further details of the invention, reference may be made to the drawings, wherein—

Fig. 3 is a front elevation partly in cross section of the device of this invention, the portion to the right of the line AA being shown in Fig. 4.

Fig. 4 is a diagrammatic view partly in cross section of the camera drive assembly, the portion to the left of the line AA being shown in Fig. 3.

Figure 1:
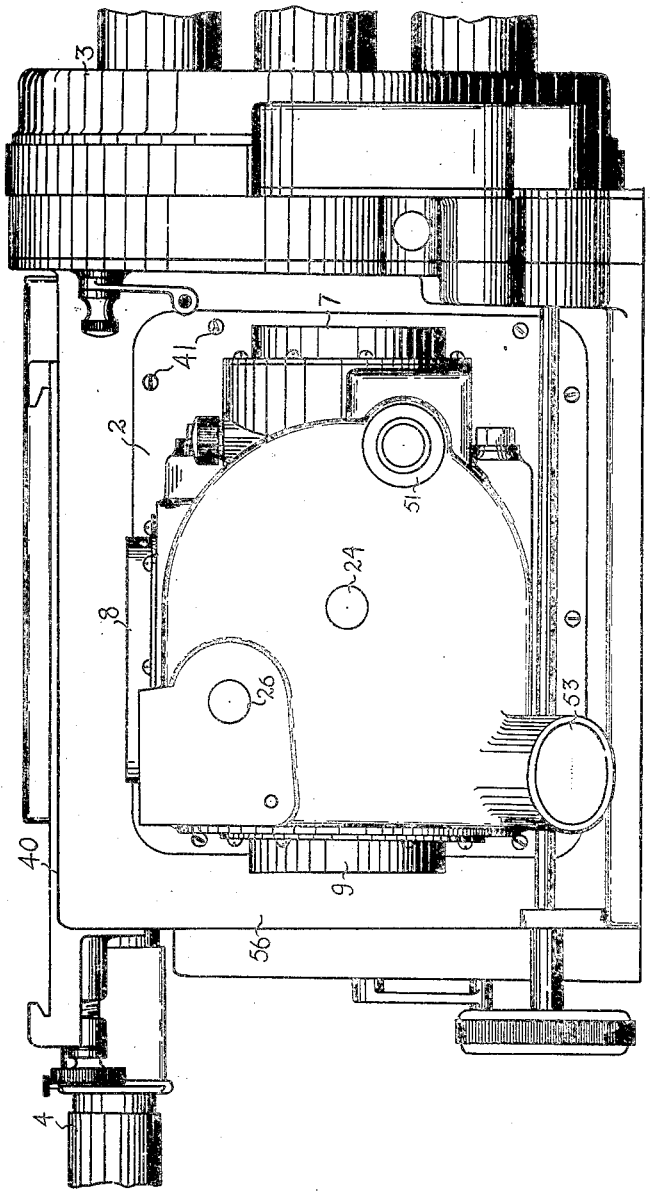
Fig. 1 is a side elevation of a motion picture camera embodying the motor suspension of this invention.

When sound motion pictures first came into general commercial use, the cameras then available were far too noisy to be practical, mainly due to the fact that the microphone used to record the sound, also recorded extraneous sounds, such as the staccato bark of an intermittent movement embodying gears and cams which were commonly used, and the unsilenced hum of a motor directly coupled to the camera shaft. These difficulties were partly overcome by providing a clumsy arrangement called a blimp. This blimp took the form of a rubber lined housing, which surrounded the camera and its motor. A cameraman had to be something of a contortionist in order to focus his camera when it was thus encumbered. The length of "shot" which could be taken was regulated by the capacity of hot air and gases accumulated by the motor that the blimp could hold.

In order to overcome these difficulties, applicant's motor 1 is mounted in a detachable casing 2 which is fastened to a side wall 56 of the camera 40 by means of screws 41. Camera 40 has a lens turret 3 (as disclosed and claimed in the copending application, Serial Number 606,084, filed April 19, 1932, by Albert W. Tondreau) and a view finder 4 (as disclosed and claimed in the copending application, Serial Number 524,026, filed March 20, 1931, by Albert W. Tondreau).

The motor 1 (Fig. 2) is of the induction or any other suitable type having a field structure 30 which also serves as an enclosing casing for the armature 57 between the two end plates 12 and 15. Fastened to the armature shaft 5 is a cooling fan 6, (Fig. 3). The pitch of fan 6 is such that cool air is sucked in through a vent 7 in the forward end of the casing 2. This cool air circulates through the motor 1 and exhausts heat generated by the armature and field coils through the vents 8 and 9 positioned to the rear of casing 2. This serves the function of cooling the motor while preventing the sound waves from penetrating to the front of the camera 40 where the microphone for recording sound is usually located.

Figure 2:
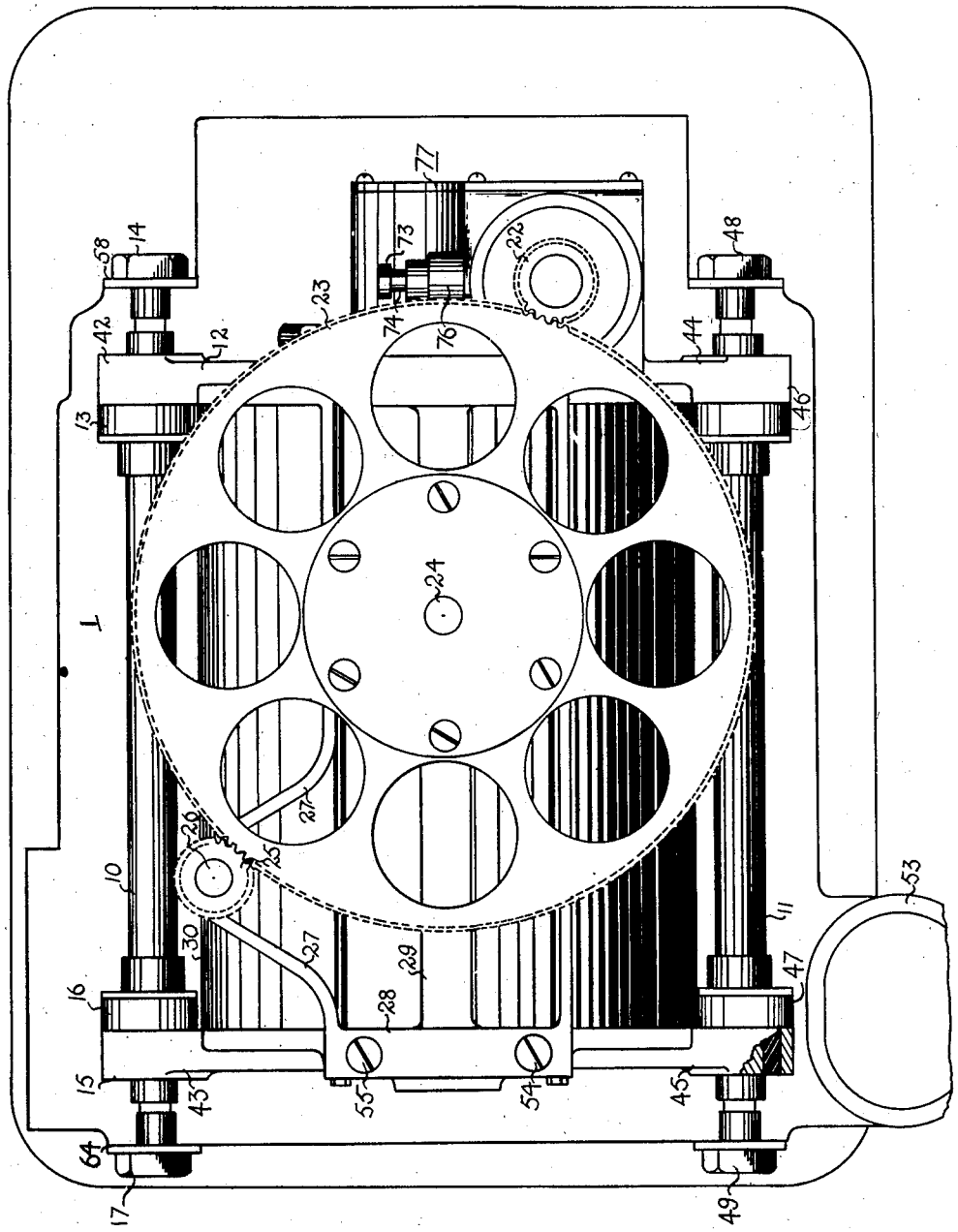
Fig. 2 is a side elevation of the motor of this invention with the outer cover plate removed in order to show the suspension thereof.

To further insure the quiet vibrationless operation of motor 1, it is suspended in casing 2 by means of the rubber insulated hanger bars 10 and 11 (Fig. 2). Referring to the bar 10, it passes through an aperture in a lug 42 on the end plate 12. A solid rubber collar 13 (Figs. 2 and 3) fits snugly around bar 10 inside the aperture in lug 42 so that there is no metallic connection therebetween. Bar 10 passes through an aperture 56 in casing 2 and is suitably fastened by nut 14. The opposite end of bar 10 is carried in an aperture in lug 43 on the end plate 15. A solid rubber collar 16 fits snugly around bar 10 inside the aperture in lug 43 so that there is no metallic connection therebetween.

Bar 10 passes through an aperture 64 in casing 2 and is suitably fastened by nut 17. A similar arrangement is provided for bar 11 through the medium of apertured lugs 44 and 45, rubber collars 46 and 47 and nuts 48 and 49. Thus it will be seen that the hanger bars 10—11 are rigidly fastened in the casing 2 and camera motor 1 with its integrally supported countershaft 20 is resiliently supported thereby.

Mounted on the forward end of armature shaft 5 (Fig. 3) is a gear wheel 18 which meshes with gear wheel 19 mounted on a countershaft 20 running at right angles to shaft 5. Shaft 20 is supported in bearing housings 65 and 66 located on either side of gear 19, and integral with end plate 12, as shown in Fig. 3. Shaft 20 passes through an aperture in the camera side wall 31 (Fig. 4) and drives a shutter shaft 32 (as disclosed and claimed in the copending application, Serial Number 591,562, filed Feb. 8, 1932, by Albert W. Tondreau) through a gear 33 mounted on shaft 32 meshing with gear 34 mounted on shaft 20'. Shaft 20' is supported in an aperture 67 in the camera partition wall 68. The shutter shaft 32 as shown, is substantially parallel to the motor shaft 5 by which it is driven. A flexible coupling 60 is mounted in the countershaft 20 between gear 34 and gear 19 to prevent vibration of the motor 1 and its integrally supported countershaft 20 from being communicated to the shutter shaft 32 and to the pull-down mechanism actuating member 61—62. Coupling 60 consists of plate 35 on shaft 20 having on its outer face three protruding pins 36—37—38 which pass through apertures in a heavy leather plate 39 on countershaft 20'.

Mounted on the end of countershaft 20', is flywheel 61 with a pin 62 eccentrically mounted thereon. This eccentric 61 serves to drive any suitable pulldown mechanism such as the pulldown mechanism disclosed and claimed in the co-pending application, Serial Number 602,728, filed April 2, 1932, by Albert W. Tondreau.

It is sometimes found desirable to crank the camera by hand, and so a square tooth clutch 21 (Fig. 3) is mounted on shaft 20 for connecting shaft 20 with either the motor armature through the gears 18 and 19 as beforementioned, or with a pinion gear 22 mounted on a stub shaft 63 journaled in the bearing housing 50. A handle 51 is fastened to the end of the stub shaft 63 so that the camera may be operated by hand in the film threading operation. The clutch 21 is splined onto shaft 20. There are two raised guide rings 69—70 on clutch 21 forming a path in which rides a pin 71 eccentrically mounted on a disc 72. Disc 72 is connected to a nut 73 through a shaft 74 supported by a bearing block 76. When the nut 73 is turned to the right, the clutch 21 engages the stub shaft 63 and the camera may be hand cranked. When nut 73 is turned to the left clutch 21 engages the motor 1 and the camera may be run therefrom. A spring 75 keeps nut 73 from being accidentally turned. The clutch assembly 21 and gears 18—19 are enclosed in a protective casing 77 integral with end-plate 12 as shown in Fig. 3.

Pinion gear 22 meshes with a large fabric gear 23 which rotates about an axis at the center of shaft 24. By attaching a handle (not shown) to shaft 24, the camera may be cranked at a very high speed.

Spaced from gear 22 is a second pinion gear 25 mounted on shaft 26 and meshing with the larger gear 23. Gear 25 is of such a ratio to gear 23 that one revolution of the shaft 26 advances the film (not shown) one frame in the camera, and can be used for one to one cranking. Shaft 26 is journaled in a housing 52, carried by an upwardly extending V-shaped arm 27 on a bracket 28, which is fastened by screws (of which 54 and 55 are shown) to the two end plates 12 and 15. Shaft 24 is journaled at 59 to a cross beam 29 in the bracket 28.

A socket holder 53 is let into the side of the casing 2 to accommodate electric connections (not shown) for the motor.

Thus it will be seen that this invention provides a motor that is solidly connected to the camera itself, and yet has no metallic connections therewith, a motor whose armature shaft is parallel with the camera shutter shaft, and an efficient cooling system that does not disturb the microphone.

Having thus particularly described the invention what is claimed as new and desired to secure by Letters Patent is:

1. A motion picture camera exposed to the open air, a motor for operating said camera, means for supporting said motor at the side of said camera, and means for directing a current of air through said motor without passing through said camera and in a direction from the front towards the back of said camera, to reduce noise currents in a microphone adjacent an object to be photographed by said camera.

2. A motion picture camera having a shutter shaft and an outside wall, a motor for operating said shutter shaft and mounted on said outside wall, a camera housing, a motor housing outside of said camera housing, ventilating openings at the front and rear of said motor housing, and means for directing a current of air through said openings in a direction from the front towards the back of said camera, to reduce noise currents in a microphone adjacent an object to be photographed by said camera.

3. A motion picture camera having a shutter shaft and an outside wall, a casing mounted on said outside wall, a motor within said casing and having the shaft thereof extending substantially parallel to said shutter shaft, a plurality of hangers mounted in said casing, means for resiliently mounting said motor on said hangers, and means for coupling the shaft of said motor to said shutter shaft.

4. A motion picture camera comprising a shutter shaft, a motor mounted on said camera and having a shaft extending substantially parallel to said shutter shaft, a countershaft extending at right angles to said motor shaft and said shutter shaft, gears for connecting said motor shaft to said countershaft, other gears for connecting said countershaft to said shutter shaft, and an eccentric pull-down mechanism actuating member mounted on said countershaft.

5. A motion picture camera, a motor mounted thereon and having a shaft, a shutter shaft for said camera, a counter shaft for connecting said motor shaft to said shutter shaft, a relatively small pinion on said counter shaft, a comparatively large gear meshing with said pinion, a second pinion meshing with said gear, and means for individually operating said pinions and said gear.

6. Arrangement for resiliently supporting a motor and its countershaft for a motion picture camera having a casing, comprising hangers at opposite sides of and substantially parallel to the motor shaft, a countershaft geared to said motor shaft and carried by the motor, means for fastening said hangers to said camera casing, and means for resiliently supporting said motor from said hangers.

7. The combination of the side wall of a camera, a motor outside of said side wall, a countershaft for and on said motor, a pair of lugs on said side wall above and below said motor respectively, aligned apertures for each pair of said lugs, a rod for each pair of said apertures, means for fastening said rods in said apertures respectively, and means for resiliently supporting said motor with said countershaft from said rods.

8. Motor drive, for a motion picture camera having a shutter shaft, comprising the combination of a casing for the motion picture camera, a casing for the motor, a countershaft on said motor, means for supporting said motor casing outside of said camera casing, means for resiliently supporting the motor with said countershaft inside of said motor casing with the shaft of said motor parallel to and at the side of the shutter shaft of said camera, means for coupling said countershaft to the shutter shaft, means for driving the camera mechanism from said motor, a ventilating fan for said motor, said motor casing having a ventilating intake adjacent the front of the camera and a ventilating outlet adjacent the back thereof.

9. The combination of the outside wall of a motion picture camera, a motor mounted outside of and on said wall for operating said camera, said motor having an armature shaft, an aperture in said wall, a shaft in said aperture, a gear on said armature shaft and a companion gear on said other shaft, an eccentric pull-down mechanism actuating member mounted on and driven by said other shaft, said two companion gears comprising the only gear drive between the armature shaft of said motor and said eccentric pull-down mechanism actuating member.

10. The combination of the outside wall of a motion picture camera, a motor mounted outside of and on said wall for operating said camera, said motor having a horizontally extending armature shaft, an aperture in said wall, a shaft in said aperture and extending horizontally at right angles to said armature shaft, a gear on said armature shaft and a companion gear on said other shaft, and an eccentric pull-down mechanism actuating member mounted on and driven by said other shaft, said two companion gears comprising the only gear drive between the armature shaft of said motor and said eccentric pull-down mechanism actuating member.

11. The combination of the outside wall of a motion picture camera, a motor mounted outside of and on said wall for operating said camera, said motor having an armature shaft, an aperture in said wall, a shaft in said aperture, a gear on said armature shaft and a companion gear on said other shaft, an eccentric pull-down mechanism actuating member mounted on and driven by said other shaft, said two companion gears comprising the only gear drive between the armature shaft of said motor and said eccentric pull-down mechanism actuating member, a shutter shaft extending parallel to the motor shaft, and a single pair of gears between said shutter shaft and said other shaft.

12. The combination of the outside wall of a motion picture camera, a motor mounted outside of and on said wall for operating said camera, said motor having an armature shaft and an end plate, an aperture in said wall, a shaft in said aperture, a gear on said armature shaft and a companion gear on said other shaft, a bearing for said other shaft at each side of said companion gears and integral with said end plate, and an eccentric pull-down mechanism actuating member mounted on and driven by said other shaft, said two companion gears comprising the only gear drive between the armature shaft of said motor and said eccentric pull-down mechanism actuating member.

13. In a motion picture camera, the combination of an electric motor having an end plate and an armature shaft, a gear on said shaft, a countershaft, a gear on said countershaft meshing with said first-mentioned gear, a bearing for said countershaft integral with said end plate, camera mechanism adapted to be driven by said countershaft, means for resiliently supporting said motor and its integrally supported countershaft, and a flexible coupling between said counter shaft and said camera mechanism.

14. In a motion picture camera, the combination of an electric motor having a casing and an armature shaft, a gear on said shaft, a countershaft extending substantially at right angles to said armature shaft, a gear on said countershaft meshing with said first-mentioned gear, a bearing for said countershaft integral with said motor casing, a driven shaft in alignment with said countershaft, a flexible coupling between said countershaft and said driven shaft, a gear on said driven shaft, a shutter shaft extending parallel to said motor shaft and having a gear meshing with said gear on said driven shaft, a pull-down mechanism actuating member on said driven shaft, and means for resiliently supporting said motor and its countershaft from the camera casing, whereby the vibration of said motor does not vary the separation of said armature shaft from said countershaft, said flexible coupling substantially preventing said vibrations from being communicated to said shutter shaft and to said actuating member.

15. In a motion picture camera the combination of an electric motor having an end plate and an armature shaft, a gear on said shaft, a countershaft extending at right angles to said motor shaft, a gear on said countershaft meshing with said first-mentioned gear, a bearing for said countershaft integral with said end plate, a camera mechanism adapted to be driven by said countershaft, means for resiliently supporting said motor and said countershaft from the camera casing comprising supporting means rigidly connected to a side wall of the camera, and means for resiliently supporting said motor from said supporting means.

16. The combination of the side wall of a camera, a motor outside of said side wall, said motor having an end plate and an armature shaft, a countershaft extending at right angles to said armature shaft, a bearing on said end plate for said countershaft, gears connecting said armature and said countershaft, a pair of lugs on said side wall above and below said motor respectively, aligned apertures for each pair of said lugs, a rod for each pair of said apertures, means for fastening said rods in said apertures respectively, and means for resiliently supporting said motor with said countershaft from said rods.

17. Means for substantially reducing the noise currents produced in a microphone adjacent the front of a camera exposed to the open air and due to the current of air employed to ventilate the motor for driving the camera, which means comprises separate conjoined compartments for the camera and its motor, means for mounting the motor in the motor compartment, said motor compartment having a ventilating intake adjacent the front of the camera and a ventilating discharge away from the front of the camera, and ventilating means operated by the motor and adapted to draw air in said intake and adapted to discharge air out of said ventilator discharge.

18. Means according to claim 17 wherein said motor mounting means is adapted to support said motor with the shaft thereof at right angles to the front and back walls of the camera, said motor mounting means also comprising means for resiliently supporting said motor in said motor compartment.

ALBERT W. TONDREAU.